Nov. 8, 1960 A. C. TITUS 2,959,698
LAMINATED CARBON BRUSH
Filed Dec. 31, 1957
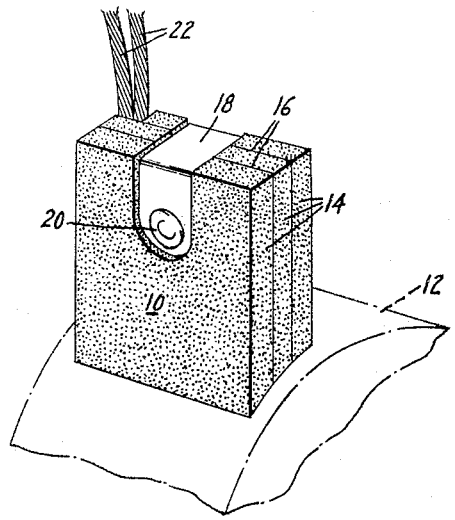
Inventor:
Albert C. Titus,
by James R Campbell
His Attorney.

United States Patent Office 2,959,698
Patented Nov. 8, 1960

2,959,698

LAMINATED CARBON BRUSH

Albert C. Titus, Schenectady, N.Y., assignor to General Electric Company, a corporation of New York Filed Dec. 31, 1957, Ser. No. 706,508

8 Claims. (Cl. 310—248)

The invention described herein relates to carbon brushes and more particularly to a laminated carbon brush capable of withstanding high operating brush temperatures when installed in a dynamoelectric machine.

The concept of employing laminated brushes for collecting current in motors and generators is old, but the cements utilized in securing the various laminations together to form a unitary brush body permit use only at relatively low temperatures, i.e., 200° C. The cements primarily consist of organic resin compounds of the thermoplastic or thermosetting variety which, inherently, are subject to the major disadvantage of becoming unstable in the 150–250° C. temperature range. The thermoplastic resins soften when these temperatures are reached thereby permitting the brush laminations to either separate or move relative with respect to each other thus resulting in destruction of the brush body. Decomposition of the resinous materials occurs when thermosetting resins are employed as the means for bonding adjacent laminations together. The decomposition takes place in the form of a burning or charring of the resinous material when the brush is subjected to high temperatures. As far as known, inorganic compounds have not been used for cementing laminations together to form a unitary brush body.

Several factors contribute to the production of heat in the brushes, the predominant ones being sparking at the commutator or slip ring, resistance offered to the flow of current through the brush and friction generated between the contacting surfaces of the brush and commutator or slip rings. As new designs and increased performance and efficiency of dynamoelectric machines appear, an increasing demand is placed on brushes requiring operation at high temperatures while retaining the stability necessary in carrying out a current collecting function. Examples of the use of such brushes exist in those applications of generators utilized for supplying high values of current, and in motors for starting engines in jet aircraft and in operating high speed power tools in industrial plants. The temperatures to which carbon brushes are subjected in these installations approach red heat and therefore require brushes which are extremely stable during machine operation.

The primary object of my invention therefore is to eliminate the deficiencies of the prior art brushes by providing a laminated carbon brush capable of withstanding high operating temperatures in the neighborhood of several hundred degrees centigrade while simultaneously performing a current collecting function.

In carrying out my invention, I coat adjacent laminated sections of carbon comprising the brush with a cement which, after being heated and melted, cools and bonds the laminations rigidly to each other and does not decompose when thereafter subjected to heat up to the high melting point. The cement exhibits glass-like characteristics and therefore presents some degree of insulation. Compounds found desirable for use as cements are eutectic lead borate, boric oxide and silver chloride.

While the specification concludes with claims particularly pointing out and distinctly claiming the subject matter which I regard as my invention, it is believed the invention will be better understood from the following description taken in connection with the accompanying drawing in which:

The singular figure in the drawing illustrates the improved laminated brush in contact with a commutator for a dynamoelectric machine.

Referring now to the drawing wherein like reference characters designate like or corresponding parts, there is shown a laminated carbon brush 10 arranged for contact with a commutator or slip ring 12 adapted for attachment to a shaft for a dynamoelectric machine. The carbon brush comprises a plurality of laminations 14 rigidly anchored together by an inorganic cement 16 of a type hereinafter described. As in the usual construction for a laminated carbon brush, a copper plate 18 bridges the laminations 14 and is secured to the brush by means of a rivet 20 or similar securing means. Current conductive shunts 22 are connected to the plate in a well known manner for carrying current to or from the current transferring surface of the commutator or slip ring.

Advancements made in design of dynamoelectric machines, particularly those adapted for use in low humidity atmospheres, has resulted in machines capable of operating at higher temperatures, principally as a result of improved insulation and better design for cooling the heat producing parts. As a consequence, the carbon brushes associated with these machines are required to operate at higher temperatures and where laminated brushes of the prior art type are used, the heat imparted to the brush causes the thermoplastic resinous compounds or cements holding the laminations together to soften or even flow when temperatures above their melting points are reached. In the case of thermosetting resins, the materials therein are not capable of withstanding such high temperatures and therefore burn and char and thereby lose their bonding characteristics. As is expected, the brush laminations become detached from one another and on occasion fall into the rotating parts of the machine with consequent damage to the operating parts.

In order to overcome the disadvantages inherent in prior art brushes using organic compounds capable of melting or decomposing at relatively low temperatures, e.g., 200° C., it has been found that an inorganic cement having the primary characteristic of a very high melting point and capable of providing some degree of insulation between the various laminations of the brush, is particularly useful in brushes operating at high temperatures. Preferably, the cements should be easily prepared, commercially available and capable of being applied to large blocks of carbon in a minimum of time. An especially desirable or advantageous cement consists of those compounds capable of taking on glass-like characteristics when melted to temperatures in the range of 600° C., and then cooled so as to obtain adhesion or bonding between the various laminations comprising the brush while also to some extent insulating them from each other. Borates, such as boric oxide, lead borate and eutectic lead borate are particularly good for these purposes.

In the preparation of such a brush, sections of carbon of the desired size, composition and conductivity are coated on either one or both sides with a cement of the type previously indicated. In some cases, a preliminary wetting treatment comprising applying a thin coating of the melted cement to laminations may be made prior to the final application of heat at a temperature sufficient to effect melting and flowing of the cementious material. When converted to the liquid state in the preliminary coating process, and then further heated, the cement wets or infiltrates and becomes bonded to the particles of carbon adjacent the surface of a lamination upon cooling. Since the cements comprise inorganic compositions, the melting point does not change upon subsequent heating thereby permitting further application of a full layer of cement to adjacent laminations. Satisfactory bonding results have been achieved by utilizing the preliminary wetting process wherein cements of silver chloride and boric oxide also were used.

An excellent bond between the laminations has been established by using eutectic lead borate as the cementing agent applied in a single application at a temperature of 650° C. This temperature is considerably above the softening point of the borate (480°) and for this reason wets the carbon in a relatively short time during the regular cementing operation. By wetting, I mean that condition which exists when the carbon particles on the adjacent surfaces of the laminations becomes soaked with cement as distinguished from that state where droplets of melted cement stand on the surface. In a preferred embodiment, eutectic lead borate has been applied to laminations in the form of a paste, thereby enabling the borate to completely cover the carbon prior to melting. After approximately a half hour bake at 650° C., the assembly is quickly subjected to the pressure of a vice for squeezing out the excess material and tightly pressing the adjacent laminations together. Temperatures in the range of 800° C. have been used for the bake, but it has been found that a reduction of the borate to a lead material occurs to a slight extent thereby slightly detracting from the insulating qualities of the cement that may be present. In effect, small conducting trees are established by the lead for carrying current between adjacent laminations.

Although specific inorganic cements have been disclosed, it is evident that other cements having either lower or higher melting points may be used equally as well so long as they fall within the inventive concept disclosed herein as being inorganic and capable of effecting adherence of carbon laminations with each other.

In some designs, it may be desirable to provide insulation between adjacent laminated sections and this may be accomplished by inserting asbestos paper of several mils thickness therebetween. Reasonably good insulation has been obtained by placing the asbestos paper between laminations treated with silver chloride. The paper is capable of being wetted readily by the cement and thereby results in a bond displaying insulation properties between the layers. In most brushes employing carbon sections having different resistivities, the need for insulation is not as great and the cement alone may be adequate. Glass cloth spacers may also be used for insulation purposes. Cloth of this type has been used with eutectic lead borate with satisfactory results.

In some brush applications it is desirable to provide an element in the brush for polishing the commutator or slip ring surfaces and thereby preventing formation of deleterious films. Some types of brushes are especially designed for this purpose by uniformly dispersing throughout the brush an abrasive material capable of cleaning the commutator without grooving or otherwise damaging the commutator surface. Large amounts of abrasive material are generally undesirable but since the amount of cement used in bonding the laminations together is in a very slight amount, it is capable of maintaining a clean surface on the commutator or slip ring. The cement therefore is capable of not only securing the various laminations together but also cleaning the current transfer surfaces.

It will be apparent that many modifications and variations are possible in light of the above teachings. It therefore is to be understood that within the scope of the appended claims, the invention may be claimed otherwise than as specifically described.

What I claim as new and desire to secure by Letters Patent of the United States is:

1. A carbon brush for use in a dynamoelectric machine comprising a plurality of laminations consisting essentially of carbon secured together by an inorganic cement to form a brush body, said inorganic cement comprising a material selected from the class consisting of lead borates, boric oxide and silver chloride.

2. A carbon brush for use in a dynamoelectric machine comprising a plurality of laminations consisting essentially of carbon and secured together by an inorganic cement having a wetting point above 455° C.

3. A carbon brush for use in a dynamoelectric machine comprising a plurality of laminations consisting essentially of carbon and secured together by a cement comprising a borate having a wetting point above 455° C.

4. The combination according to claim 5 wherein glass cloth spacers are interposed between adjacent laminations.

5. A carbon brush for use in a dynamoelectric machine comprising a plurality of laminations consisting essentially of carbon secured together by an inorganic cement to form a brush body, said inorganic cement comprising eutectic lead borate.

6. A carbon brush for use in a dynamoelectric machine comprising a plurality of laminations consisting essentially of carbon secured together by an inorganic cement to form a brush body, said inorganic cement comprising lead borate.

7. A carbon brush for use in a dynamoelectric machine comprising a plurality of laminations consisting essentially of carbon secured together by an inorganic cement to form a brush body, said inorganic cement comprising boric oxide.

8. A carbon brush for use in a dynamoelectric machine comprising a plurality of laminations consisting essentially of carbon secured together by an inorganic cement to form a brush body, said inorganic cement comprising silver chloride.

References Cited in the file of this patent

UNITED STATES PATENTS

| | | |
|---|---|---|
| 2,125,027 | Kaperowski | July 26, 1938 |
| 2,414,514 | Elsey | Jan. 21, 1947 |
| 2,819,989 | Kiefer | Jan. 14, 1958 |

FOREIGN PATENTS

| | | |
|---|---|---|
| 459,698 | Great Britain | Jan. 13, 1937 |
| 1,107,113 | France | Aug. 3, 1955 |